United States Patent
Ueno et al.

(10) Patent No.: US 10,050,497 B2
(45) Date of Patent: Aug. 14, 2018

(54) METHOD OF ASSEMBLING ROTARY ELECTRIC MACHINE

(71) Applicant: Kabushiki Kaisha Toshiba, Minato-ku (JP)

(72) Inventors: Souichi Ueno, Ota (JP); Noriyasu Kobayashi, Yokohama (JP); Daisuke Iwashita, Kawasaki (JP); Masahiro Yamada, Yokohama (JP); Tomoaki Takahashi, Yokohama (JP); Naosuke Ote, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 97 days.

(21) Appl. No.: 15/197,886

(22) Filed: Jun. 30, 2016

(65) Prior Publication Data
US 2017/0054349 A1    Feb. 23, 2017

(30) Foreign Application Priority Data
Jul. 14, 2015    (JP) .................................. 2015-140691

(51) Int. Cl.
*H02K 15/00* (2006.01)
*H02K 15/14* (2006.01)
*H02K 15/16* (2006.01)
*H02K 15/02* (2006.01)

(52) U.S. Cl.
CPC ..... *H02K 15/0068* (2013.01); *H02K 15/0093* (2013.01); *H02K 15/02* (2013.01)

(58) Field of Classification Search
CPC . H02K 15/0068; H02K 15/02; H02K 15/0093
See application file for complete search history.

(56) References Cited

U.S. PATENT DOCUMENTS

| | | | | |
|---|---|---|---|---|
| 3,809,989 | A * | 5/1974 | Hays | H01F 7/1805 310/49.02 |
| 5,736,655 | A * | 4/1998 | Sekito | G01N 33/20 324/546 |
| 6,731,027 | B2 * | 5/2004 | Ohnishi | H02K 37/18 310/112 |
| 7,358,699 | B2 * | 4/2008 | Kikuchi | H02K 11/048 310/113 |
| 8,937,414 | B2 * | 1/2015 | Song | H02K 1/20 310/254.1 |

(Continued)

FOREIGN PATENT DOCUMENTS

| | | | | |
|---|---|---|---|---|
| JP | 58063049 | A * | 4/1983 | ............... H02K 3/12 |
| JP | 10262351 | A * | 9/1998 | |

(Continued)

*Primary Examiner* — Paul D Kim
(74) *Attorney, Agent, or Firm* — Oblon, McClelland, Maier & Neustadt, L.L.P.

(57) ABSTRACT

A method comprises: a step of disposing a coil end connection portion of a first stator coil end and a solid connection at mutually adjacent positions after the solid connection and the cooling water pipe are brazed together; a step of disposing a heating coil around the solid connection and the first stator coil end in such a way as to bypass the cooling water pipe connection portion; and a step of supplying the heating coil with alternating current, so that the solid connection and the first stator coil end are induce-heated and then connected.

6 Claims, 5 Drawing Sheets

(56) References Cited

U.S. PATENT DOCUMENTS

2010/0043206 A1* 2/2010 Yamashita ............. B82Y 25/00
29/598
2014/0175802 A1* 6/2014 Taniyama ............... F03D 9/002
290/55

FOREIGN PATENT DOCUMENTS

| JP | 2002-170657 | 6/2002 |
| JP | 2004-327375 | 11/2004 |
| JP | 2011-025249 | 10/2011 |

* cited by examiner

METHOD OF ASSEMBLING ROTARY ELECTRIC MACHINE

CROSS-REFERENCE TO RELATED APPLICATION

This application is based upon and claims the benefit of priority from Japanese Patent Application No. 2015-140691, filed Jul. 14, 2015; the entire content of which is incorporated herein by reference.

FIELD

Embodiments of the present invention relate to a method of assembling a rotary electric machine including brazing of stator coil ends of a rotary electric machine, such as power generator, as well as to a brazing device for stator coil ends for that purpose.

BACKGROUND

The brazing of metal members has been widely employed. Its heat sources include torches, microwaves and alternating magnetic fields. Especially the induction heating by alternating magnetic fields is effective since it is relatively easy to control temperatures and efficient heating is possible.

Induction heating, as represented by IH (Induction Heating) cookers, is a popular, widely-used heating source. The technique for using induction heating for brazing is being developed (Refer to Japanese Patent Application Laid-Open Publication No. 2002-170657).

DETAILED DESCRIPTION

The technique disclosed in Japanese Patent Application Laid-Open Publication No. 2002-170657 is effective when a number of to-be-heated objects that are almost identical in shape and material are processed successively. Resonance conditions in a system containing the to-be-heated objects vary depending on the coupling state of electromagnetic fields, which are determined by impedance of the to-be-heated objects and a positional relationship between a heating coil and the to-be-heated objects. Accordingly, if mass-produced products are heated on a production line, it is easy to manage heat-input conditions associated with a change in the impedance of the to-be-heated objects or in the positional relationship between the heating coil and the to-be-heated objects.

Meanwhile, in the process of assembling or repairing a rotary electric machine, brazing is carried out to connect stator coil ends to solid connection. In the case of the brazing for connecting stator coil ends to solid connection, a joint pipe (cooling water pipe), through which cooling water flows, is already brazed near the connection of the solid connection. This portion can be overheated if only a step has taken to improve the efficiency of heating the to-be-heated objects. If the stator coil ends of the rotary electric machine are connected on site, it is difficult in many cases to braze with preplaced brazing filler metal in terms of structure because the solid connection are to be connected to ready-made stator coil ends. This requires workers to employ insertion brazing. In such a case, the shape of the heating coil is limited due to the confined space for insertion brazing operation, the distance between adjacent solid connections and other reasons.

Embodiments of the present invention have been made in view of such circumstances. The object of the present invention is to braze stator coil ends to a solid connection in a highly reliable manner.

According to an embodiment of the present invention, there is provided a rotary electric machine assembly method comprising: a disposing step of disposing at least one stator coil, which is made of electrically conductive material, substantially in an axial direction; a preparation step of brazing a cooling water pipe to a solid connection made of electrically conductive material to be electrically connected to a stator coil end, or an end of the stator coil in a coil end connection portion, in a cooling water pipe connection portion that is different from the coil end connection portion; a solid connection disposing step of disposing the coil end connection portion of the stator coil end and the solid connection at a position where brazing is possible after the solid connection and the cooling water pipe are brazed together; a heating coil disposing step of disposing a heating coil around the solid connection and the stator coil end in such a way as to bypass the cooling water pipe connection portion; and a connecting step of supplying the heating coil with alternating current after the solid connection disposing step and the heating coil disposing step, so that the solid connection and the stator coil end are induce-heated and then connected in the coil end connection portion.

According to another embodiment of the present invention, there is provided a stator coil end brazing device for brazing a stator coil end and a solid connection of a rotary electric machine at a coil end connection portion, the rotary electric machine including: the stator coil that is made of electrically conductive material and is disposed substantially in an axial direction, and the solid connection that is made of electrically conductive material and is electrically connected in the coil end connection portion to the stator coil end or an end of the stator coil, with a cooling water pipe connected to a cooling water pipe connection portion that is different from the coil end connection portion, the brazing device comprising: a heating coil that can be disposed around the solid connection and the stator coil end after the coil end connection portion is disposed at a position where brazing is possible and which has a bypass portion that bypasses a vicinity of the cooling water pipe connection portion.

Hereinafter, with reference to the accompanying drawings, embodiments of a method of assembling stator coil ends of a rotary electric machine related to the present invention, as well as a stator coil end brazing device used in the assembly method, will be described. The same or similar portions will be represented by the same reference symbols and not be explained repeatedly.

First Embodiment

Figure 1:
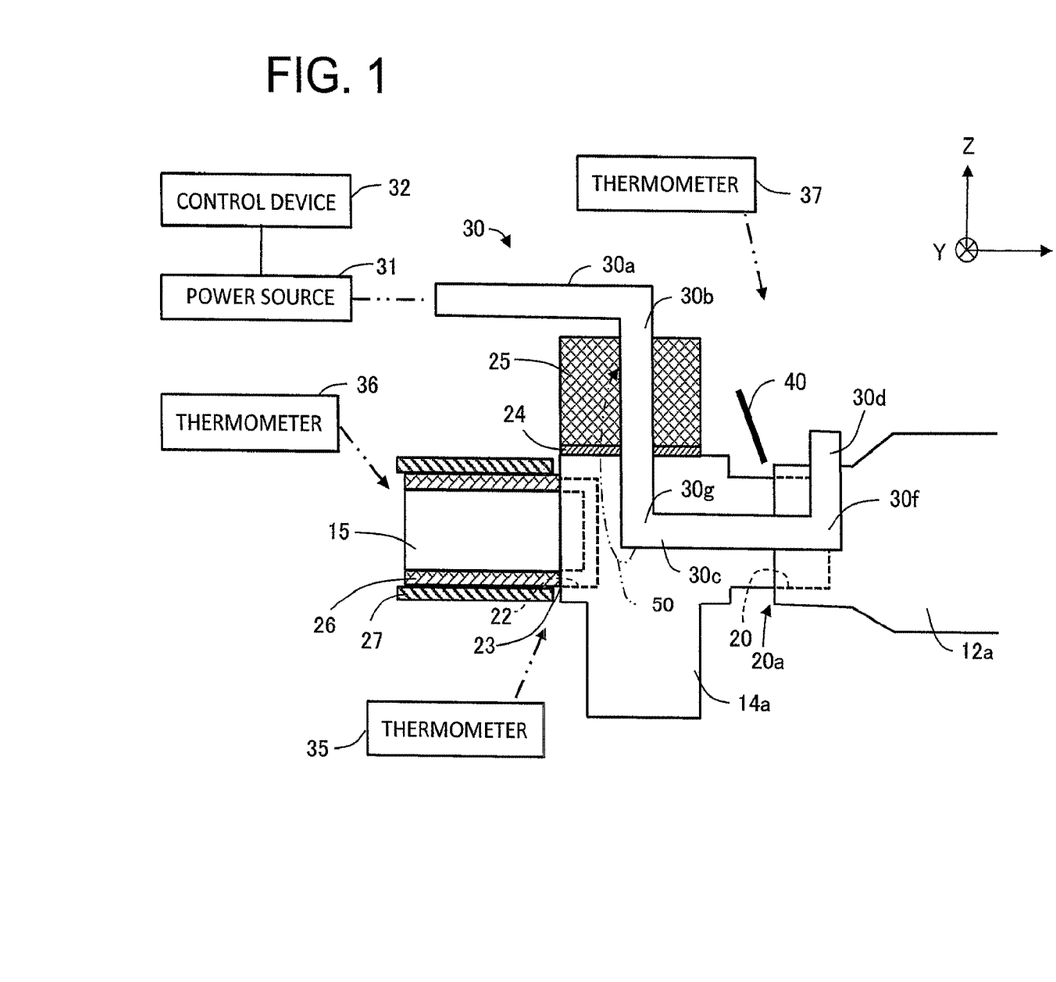
FIG. 1 is a side view schematically showing a state of a heating/brazing process of a stator coil end assembly method of a rotary electric machine according to a first embodiment of the present invention.
Figure 2:
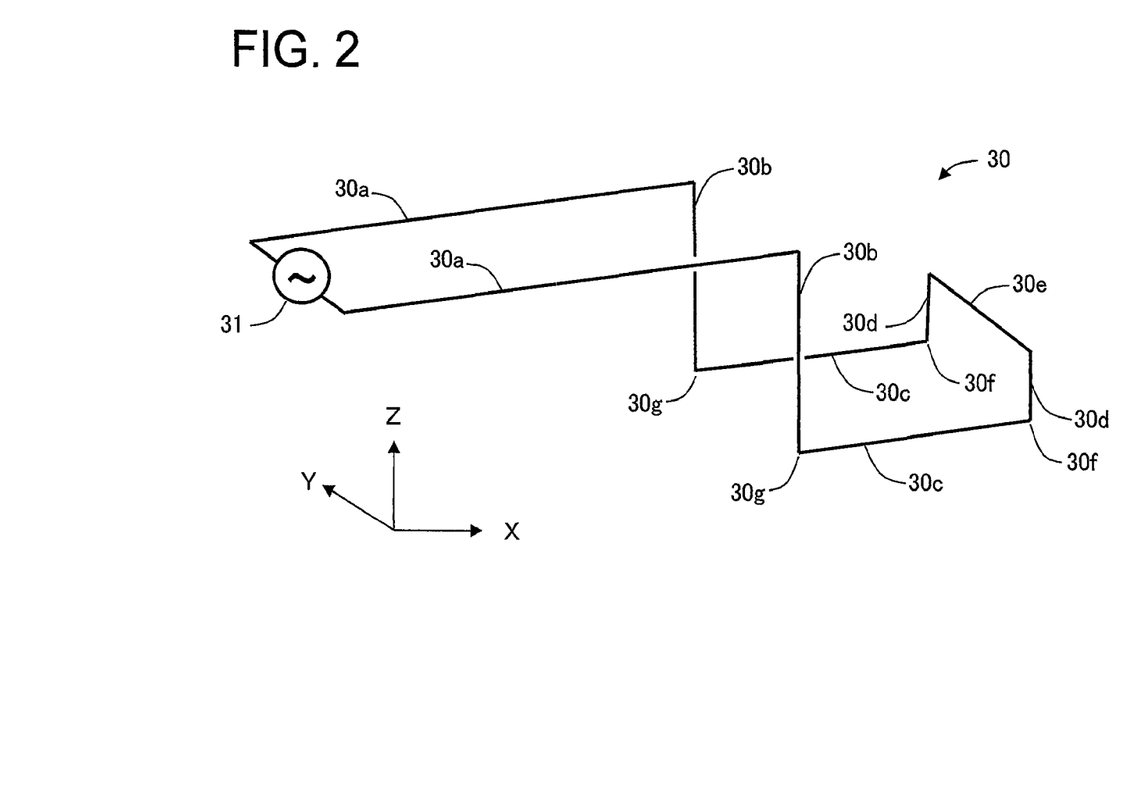
FIG. 2 is a perspective view schematically showing a heating coil shown in FIG. 1, which has been taken out.
Figure 3:
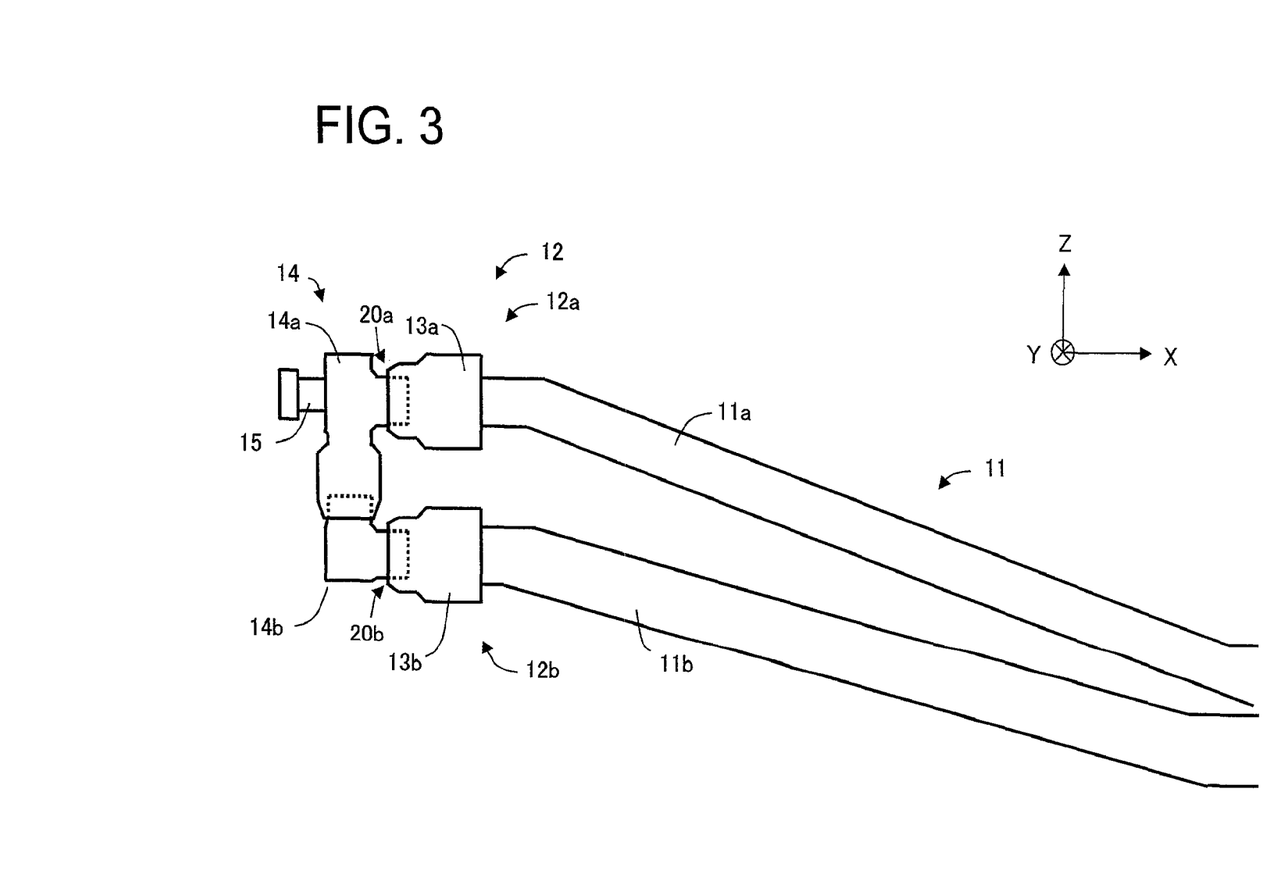
FIG. 3 is a side view showing a situation near stator coil ends assembled by the stator coil end assembly method of the rotary electric machine according to the first embodiment of the present invention.
Figure 4:
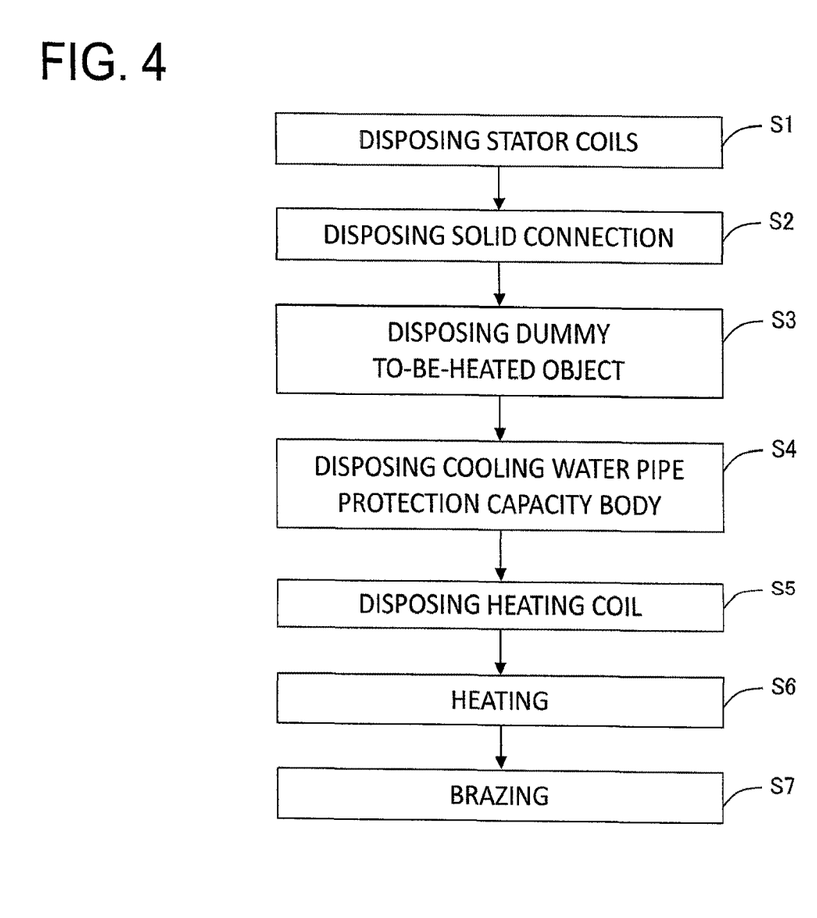
FIG. 4 is a flowchart showing the procedure of the stator coil end assembly method of the rotary electric machine according to the first embodiment of the present invention.

FIG. 1 is a side view schematically showing a state of a heating/brazing process of a stator coil end assembly method of a rotary electric machine according to a first embodiment of the present invention. FIG. 2 is a perspective view schematically showing a heating coil shown in FIG. 1, which has been taken out. FIG. 3 is a side view showing a situation near stator coil ends assembled by the stator coil end assembly method of the rotary electric machine according to the first embodiment of the present invention. FIG. 4 is a flowchart showing the procedure of the stator coil end assembly method of the rotary electric machine according to the first embodiment of the present invention.

The stator coil end assembly method of the rotary electric machine of this embodiment realizes the assembled state near stator coil ends as shown in FIG. 3 by brazing with induction heating. Stator coils 11 of the rotary electric machine virtually extend parallelly in the direction (X-direction in the diagram) of a rotation axis of the rotary electric machine; stator coil ends 12, which are the axial-direction ends of the coils, are electrically connected each other via a solid connection 14. A number of stator coils 11 of the rotary electric machine are disposed. FIG. 3 only shows two coils that are adjacent to each other in the radial direction (Z-direction in the diagram) of the rotary electric machine, which are a first stator coil 11a and a second stator coil 11b. The axial-direction ends of the first and second stator coils 11a and 11b, or first and second stator coil ends 12a and 12b respectively have clips 13a and 13b formed.

In order to electrically connect the first stator coil end 12a and the second stator coil end 12b together, the solid connection 14 is brazed to the first stator coil end 12a and the second stator coil end 12b via coil end connection portions 20a and 20b. The solid connection 14 includes a solid connection first member 14a and a solid connection second member 14b, which are brazed together.

On the opposite side (minus X-direction in the diagram) of the solid connection first member 14a from the first stator coil end 12a, a cooling water pipe 15, through which cooling water flows to cool the stator coil ends 12 and the solid connection 14, is brazed in a cooling water pipe connection portion 23. The cross section of the stator coil 11 that is parallel to Y-Z plane is substantially rectangular. In FIGS. 1 and 3, which show X-Z plane, the sides of stator coil 11, clips 13a and 13b and solid connection 14, i.e. the circumferential-direction (Y-direction) end surface of the stator coil 11, are shown.

The stator coils 11 and the solid connection 14 are made of electrically conductive material, such as copper, so that electric current flows with low resistance. The cooling water pipe 15 is, for example, made of stainless steel since there is no need for electric current to flow therethrough.

A method of brazing the first stator coil end 12a and the solid connection first member 14a together will be described with reference to FIGS. 1, 2 and 4.

On a first stator coil end 12a at an end of the connection portion (coil end connection portion) 20a for connecting the first stator coil end 12a and the solid connection first member 14a, a dent 20 is formed.

The first and second stator coils 11a and 11b are disposed adjacent to each other as shown in FIG. 3 (Step S1).

On the opposite side (left side in FIGS. 1 and 3; minus X-direction) of the solid connection first member 14a from the first stator coil end 12a, a dent 22 is formed. The leading end of the cooling water pipe 15 is inserted into the dent 22 and brazed in the cooling water pipe connection portion 23.

As shown in FIG. 1, the solid connection first member 14a is disposed in such a way that an X-direction end portion, which is part of the solid connection first member 14a, and its surrounding area are inserted into the dent 20 (Step S2).

Then an electrically conductive resilient member 24 is disposed in a direction away from the cooling water pipe connection portion 23 of the solid connection first member 14a and in a direction (Z-direction upper side in FIG. 1) away from the first stator coil end 12a; on the opposite side of the conductive resilient member 24 from the solid connection first member 14a, a dummy to-be-heated object 25 is disposed (Step S3).

The dummy to-be-heated object 25 is made of electrically conductive material such as copper. The dummy to-be-heated object 25 is to curb induced electric current generated in the cooling water pipe connection portion 23 and its surrounding area at a time when alternating current flows through a heating coil 30 described later.

The conductive resilient member 24 is a sheet made of electric and heat conductive rubber. More specifically, the conductive resilient member 24 may be made from heat-resistant rubber to which carbon nanotubes have been added. If the surfaces of the solid connection first member 14a and dummy to-be-heated object 25 that face each other are uneven, the conductive resilient member 24 placed therebetween adheres closely to the member 14a and the object 25, facilitating the flow of electricity and heat between the solid connection first member 14a and the dummy to-be-heated object 25. If the gap between the portions of the solid connection first member 14a and the dummy to-be-heated object 25 that face each other is sufficiently small, the conductive resilient member 24 can be omitted.

Then, insulator 26 is put on the outer side of the cooling water pipe 15; and across the outer side of the insulator 26, a cylindrical cooling water pipe protection capacity body 27 is placed (Step S4). The cooling water pipe protection capacity body 27 is made of electrically conductive material, and the insulator 26 is made of electrical insulating material that is low in thermal conductivity. The insulator 26 is for example a mesh sheet, which is placed between the outer surface of the cooling water pipe 15 and the cooling water pipe protection capacity body 27. Even if the cooling water pipe protection capacity body 27 is heated by eddy current generated inside the cooling water pipe protection capacity body 27 due to leakage fluxes such as those from the heating coil 30, this configuration keeps the cooling water pipe connection portion 23 from being overheated by the heat.

Then, workers or others place the heating coil 30, and the heating coil 30 is connected to an electric power source 31 (Step S5). The power source 31 is also connected to a control device 32. The heating coil 30 is formed into a loop with two electrodes of the power source 31 inserted therein.

As shown in FIG. 2, the heating coil 30 includes: two first axial-direction parallel portions 30a, which each are connected to the two electrodes of the power source 31 and which extend parallelly to each other in K-direction; two first radial-direction parallel portions 30b, which are connected to each of the end portions of the two first axial-direction parallel portions 30a and are bent at a right angle to the first axial-direction parallel portions 30a and which extend downward in Z-direction in such a way as to be parallel to each other; two second axial-direction parallel portions 30c, which are connected each of the leading ends of the two first radial-direction parallel portions 30b and extend parallelly to each other in almost the same direction (X-direction) as the first axial-direction parallel portions 30a; two second radial-direction parallel portions 30d, which are connected to each of the leading ends of the two second axial-direction parallel portions 30c and extend upward in Z-direction in such a way as to be opposite to that of the first radial-direction parallel portions 30b and be parallel to each other; and a connection portion 30e, which connects the upper ends of the two second radial-direction parallel portions 30d together in Y-direction.

The two first radial-direction parallel portions 30b are disposed in such a way as to have the solid connection first member 14a, the conductive resilient member 24 and the dummy to-be-heated object 25 therebetween in Y-direction. The two second axial-direction parallel portions 30c are disposed in such a way as to have the solid connection first member 14a and the first stator coil end 12a therebetween in Y-direction. The two second radial-direction parallel portions 30d and the connection portion 30e are disposed in such a way as to surround an area where the solid connection first member 14a and the first stator coil end 12a are joined. As shown in FIG. 1, when the first stator coil end 12a and the solid connection first member 14a are disposed in such a way as to allow its connection portion (coil end connection portion) 20a to be brazed, the heating coil 30 overall can be disposed around the solid connection first member 14a and the first stator coil end 12a.

The second axial-direction parallel portions 30c are portions that are disposed on the sides of the solid connection first member 14a and the first stator coil end 12a. The second axial-direction parallel portions 30c are disposed around a central portion in the radial direction (Z-direction in FIGS. 1 to 3) of the coil end connection portion 20a in such a way as to substantially extend along the axial direction (X-direction in FIGS. 1 to 3) of the rotary electric machine or the first stator coil end 12a. In the end portions of the second axial-direction parallel portions 30c that are at the side of the first stator coil end 12a, first bent portions 30f are formed. In the end portions of the second axial-direction parallel portions 30c that are at the side of the solid connection first member 14a, second bent portions 30g are formed. When seen from the second axial-direction parallel portions 30c, the heating coil 30 is bent in the same direction (or upwards) at the first and second bent portions 30f and 30g.

As described above, the heating coil 30 is for example placed by workers. Therefore, it is not necessarily required that the second axial-direction parallel portions 30c be exactly in the axial direction (X-direction in FIGS. 1 to 3) of the rotary electric machine or the first stator coil end 12a. All that is required is for the second axial-direction parallel portions 30c to virtually extend in the axial direction (X-direction in FIGS. 1 to 3) to the extent that workers can confirm it. Similarly, as for the radial-direction position where the second axial-direction parallel portions 30c is disposed, all that is required is for the second axial-direction parallel portions 30c to be virtually disposed near the central portion in the radial direction (Z-direction in FIGS. 1 to 3) of the coil end connection portion 20a to the extent that workers can visually confirm it, for example.

In this case, the first radial-direction parallel portions 30b, which are bent in the radial direction from the second bent portions 30g, are provided to prevent the heating coil 30 passing near the cooling water pipe connection portion 23 and the cooling water pipe 15. The first radial-direction parallel portions 30b therefore can be referred to as bypass portions.

According to the present embodiment, the first and second bent portions 30f and 30g are bent at right angles as described above. However, the bending angle is not limited to 90 degrees. That is, the angle could be any other than 90 degrees if the first radial-direction parallel portions 30b or the second radial-direction parallel portions 30d, which are bent at the first and second bent portions 30f and 30g from the second axial-direction parallel portions 30c, contain radial-direction components.

The bypass portions, or the first radial-direction parallel portions 30b, are bent in a direction different from (or preferably opposite to) the direction in which the solid connection first member 14a goes toward the second stator coil end 12b (or direction to the side of the solid connection second member 14b).

At this time, three thermometers are disposed, which are: a cooling water pipe connection portion thermometer 35 for measuring the temperature of the cooling water pipe connection portion 23; a cooling water pipe thermometer 36 for measuring the temperature of the cooling water pipe 15; and a coil end connection portion thermometer 37 for measuring the temperature of the coil end connection portion 20a. These thermometers 35, 36 and 37 are preferably non-contact type temperature measurement instruments, such as infrared thermometers or radiation thermometers.

Then, under the control of the control device 32, alternating current is supplied from the power source 31 to the heating coil 30, and induction heating heats up the coil end connection portion 20a (Step S6). When the heating is being conducted by the induction heating, brazing filler metal 40 is melted and injected into the coil end connection portion 20a from the outside for brazing (Step S7).

At the heating step (Step S6) and the brazing step (Step S7), the existence of the first radial-direction parallel portions (bypass portions) 30b helps curb an impact on the cooling water pipe connection portion 23 from the induction heating by alternating current flowing through the heating coil 30.

Furthermore, the existence of the dummy to-be-heated object 25 and conductive resilient member 24 helps curb an impact on the cooling water pipe connection portion 23 from the induction heating. The eddy current that bypasses and flows into the dummy to-be-heated object 25 is schematically represented by arrow 50 in FIG. 1. Furthermore, the existence of the cooling water pipe protection capacity body 27 and insulator 26 helps curb an impact on the cooling water pipe 15 from the induction heating, thereby keeping the cooling water pipe connection portion 23 from being overheated.

At this time, by monitoring the cooling water pipe connection portion thermometer 35, the cooling water pipe thermometer 36 and the coil end connection portion thermometer 37, the control device 32 may reduce the amount of electric current being supplied to the heating coil 30 from the power source 31 when the readings of the thermometers rise above their predetermined thresholds, or the control device 32 may stop the electric current. In this manner, the cooling water pipe connection portion 23 is prevented from overheating.

With reference to FIGS. 1, 2 and 4, an explanation has been given of how to braze the first stator coil end 12a and the solid connection first member 14a. This method can also be applied to the brazing of the second stator coil end 12*b*, shown in FIG. 3, to the solid connection second member 14*b* of the solid connection 14.

In this case, the heating coil 30, shown in FIGS. 1 and 2, is turned upside down (in Z-direction) before being disposed around the solid connection second member 14*b* and the second stator coil end 12*b*. At this time, the first radial-direction parallel portions 30*b* (bypass portions) of the heating coil 30 are bent in a direction different from (or preferably opposite to) the direction in which the solid connection second member 14*b* goes toward the first stator coil end 12*a* (or the direction of the side of the solid connection first member 14*a*). That is, according to the present embodiment, when the heating coil 30 is disposed around either the first stator coil end 12*a* or the second stator coil end 12*b*, and when either the first stator coil end 12*a* or the second stator coil end 12*b* is heated at the end to be connected to the solid connection 14, the first radial-direction parallel portions 30*b* (bypass portions) are disposed in such a way as to bypass in a direction different from (or preferably opposite to) the direction in which the solid connection 14 extends to the other sides of the first stator coil end 12*a* and the second stator coil end 12*b*.

This arrangement of the heating coil 30 makes the rotary electric machine assembly method and stator coil end brazing device of the present embodiment applicable to the brazing of the first stator coil end 12*a* to the solid connection first member 14*a* as well as to the brazing of the second stator coil end 12*b* to the solid connection second member 14*b*.

There is no problem with applying the present embodiment to an example shown in FIG. 3 in which the cooling water pipe 15 is not connected to the side of the solid connection second member 14*b* that is connected to the second stator coil end 12*b*. Unlike the example of FIG. 3, when the cooling water pipe 15 is joined only to the side of the second stator coil end 12*b* of the solid connection 14 or to both the sides of the first stator coil end 12*a* and the second stator coil end 12*b*, the present embodiment may be applied to the brazing of the second stator coil end 12*b* to the solid connection second member 14*b*. In this case, as in the explanation given with FIGS. 1, 2 and 4, an impact on the cooling water pipe connection portion 23 from the induction heating by alternating current flowing through the heating coil 30 can be curbed.

Second Embodiment

Figure 5:
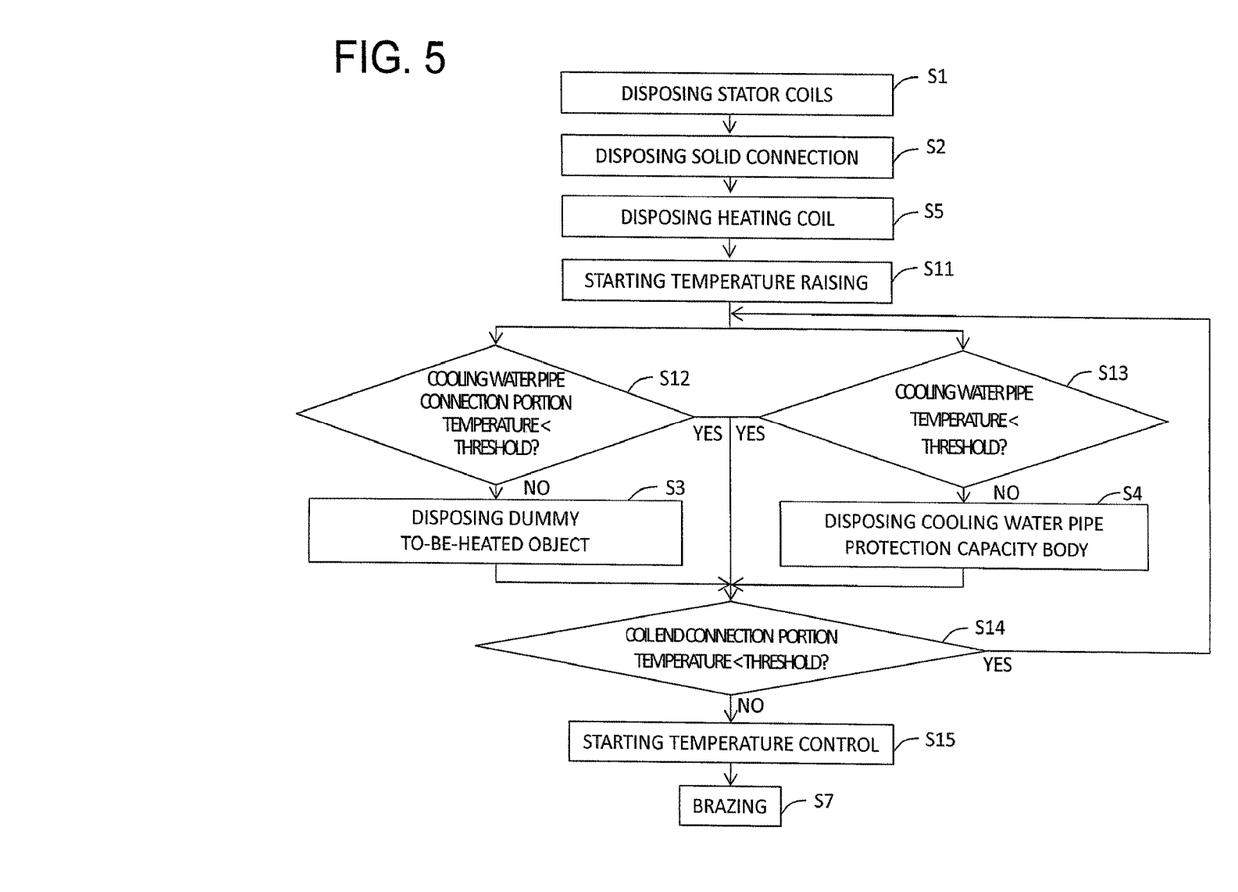
FIG. 5 is a flowchart showing the procedure of a stator coil end assembly method of a rotary electric machine according to a second embodiment of the present invention.

FIG. 5 is a flowchart showing the procedure of a stator coil end assembly method of a rotary electric machine according to a second embodiment of the present invention.

According to the above-described first embodiment, before the heating is initiated with electricity to the heating coil 30, the conductive resilient member 24 and the dummy to-be-heated object 25 are disposed, along with the insulator 26 and the cooling water pipe protection capacity body 27.

According to the second embodiment, before the conductive resilient member 24, the dummy to-be-heated object 25, the insulator 26 and the cooling water pipe protection capacity body 27 are disposed, the heating coil 30 is placed and electric current is supplied to the heating coil 30 to heat and raise temperatures. After that, the conductive resilient member 24, the dummy to-be-heated object 25, the insulator 26 and the cooling water pipe protection capacity body 27 are disposed when necessary.

That is, according to the second embodiment, as shown in FIG. 5, as in the first embodiment, the first and second stator coils 11*a* and 11*b* are first disposed (Step S1), and then the solid connection first member 14*a* is placed (Step S2).

Then, the heating coil 30 is disposed and connected to the power source 31 (Step S5). At this time, the power source 31 is connected to the control device 32. Moreover, the cooling water pipe connection portion thermometer 35, the cooling water pipe thermometer 36 and the coil end connection portion thermometer 37 are disposed. At this point, the conductive resilient member 24, the dummy to-be-heated object 25, the insulator 26 and the cooling water pipe protection capacity body 27 have yet to be disposed, which is different from the first embodiment.

Then, under the control of the control device 32, alternating current is supplied from the power source 31 to the heating coil 30, thereby initiating the raising of temperatures by induction heating (Step S11).

When the temperature of the cooling water pipe connection portion 23 exceeds a predetermined cooling water pipe connection portion temperature threshold value after the raising of temperatures begins (Step S12: NO), the conductive resilient member 24 and the dummy to-be-heated object 25 are disposed (Step S3).

When the temperature of the cooling water pipe 15 exceeds a predetermined cooling water pipe temperature threshold value after the raising of temperatures begins (Step S13: NO), the insulator 26 and the cooling water pipe protection capacity body 27 are disposed (Step S4).

Then, the temperatures are raised further. When the temperature of the coil end connection portion 20*a* exceeds a predetermined coil end connection portion temperature threshold value Step S14: NO), temperature control starts (Step S15). That is, after that, the control device 32 controls the amount of electric current supplied to the heating coil 30 from the power source 31, so that the coil end connection portion temperature measured by the coil end connection portion thermometer 37 stays in an almost constant, predetermined brazing temperature range.

This temperature control continues for a predetermined period of time, and then brazing (Step S7) is carried out during the continued temperature control.

According to this embodiment, the installation of the conductive resilient member 24 and the dummy to-be-heated object 25, as well as that of the insulator 26 and the cooling water pipe protection capacity body 27, is carried out when necessary. If not, the installation of these components can be omitted.

Other Embodiments

According to the above-described embodiments, the conductive resilient member 24 and the dummy to-be-heated object 25 are mounted on the solid connection first member 14*a*. In another example, a projection that serves as the dummy to-be-heated object 25 may be integrally formed on the solid connection first member 14*a* in advance. In such a case, the step of mounting the conductive resilient member 24 and the dummy to-be-heated object 25 on the solid connection first member 14*a* can be omitted.

In the explanation given above, three thermometers, or the cooling water pipe connection portion thermometer 35, the cooling water pipe thermometer 36 and the coil end connection portion thermometer 37, are used to measure temperatures at three spots. However, the number of measurement spots can be reduced to two or one in such a way to cover all, or temperatures at multiple spots can be measured by moving one or more thermometers.

In the explanation given above, such expressions as "upward" or "downward" are used. However, these terms are used for convenience of explanation, and the present invention can be implemented regardless of the direction of the gravity. As for such expressions as the axial direction, circumferential direction and radial direction of the rotary electric machine, stator coil or stator coil end, it is not necessarily required that these directions be exactly parallel to X-, Y-, or Z-axis shown in FIGS. 1 to 3. All that is required is for these directions to substantially match such axial directions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended, to cover such forms or modifications as would fall within the scope and spirit of the inventions.

What is claimed is:

1. A rotary electric machine assembly method comprising:
a disposing step of disposing at least one stator coil, which is made of electrically conductive material, substantially in an axial direction;
a preparation step of brazing a cooling water pipe to a solid connection made of electrically conductive material to be electrically connected to a stator coil end, or an end of the stator coil in a coil end connection portion, in a cooling water pipe connection portion that is different from the coil end connection portion;
a solid connection disposing step of disposing the coil end connection portion of the stator coil end and the solid connection at a position where brazing is possible after the solid connection and the cooling water pipe are brazed together;
a heating coil disposing step of disposing a heating coil around the solid connection and the stator coil end in such a way as to bypass the cooling water pipe connection portion; and
a connecting step of supplying the heating coil with alternating current after the solid connection disposing step and the heating coil disposing step, so that the solid connection and the stator coil end are induce-heated and then connected in the coil end connection portion.

2. The rotary electric machine assembly method according to claim 1, wherein:
the at least one stator coil includes a first stator coil and a second stator coil, with a stator coil end of the first stator coil referred to as a first stator coil end, and a stator coil end of the second stator coil as a second stator coil end;
the solid connection is configured to electrically connect the first stator coil end to the second stator coil end; and
when the heating coil is disposed around the first stator coil end or the second stator coil end and the solid connection, the heating coil is disposed in such a way that the heating coil bypasses in a direction different from a direction of the second stator coil end.

3. The rotary electric machine assembly method according to claim 1, further comprising
a dummy to-be-heated object disposing step of disposing a dummy to-be-heated object, which is made of electrically conductive material, adjacent to the solid connection in a direction in which the heating coil bypasses.

4. The rotary electric machine assembly method according to claim 2, further comprising
a cooling water pipe connection portion temperature measurement step of measuring a temperature of the cooling water pipe connection portion for the solid connection and the cooling pope, wherein
the dummy to-be-heated object disposing step is carried out at a time when the temperature of the cooling water pipe connection portion at the cooling water pipe connection portion temperature measurement step exceeds a predetermined cooling water pipe connection portion temperature threshold.

5. The rotary electric machine assembly method according to claim 1, further comprising
a cooling water pipe protection capacity body disposing step of disposing an electrically conductive cooling water pipe protection capacity body between positions where the cooling water pipe and the heating coil are placed, as well as an insulator between the cooling water pipe and the cooling water pipe protection capacity body.

6. The rotary electric machine assembly method according to claim 1, wherein
the connecting step includes a temperature control step of controlling an amount of alternating current through the heating coil in such a way that a temperature of the coil end connection portion for the solid connection and the stator coil end is maintained within a predetermined brazing temperature range.

* * * * *